(No Model.)
H. TREMBATH.
SAND BAND.
No. 428,870. Patented May 27, 1890.
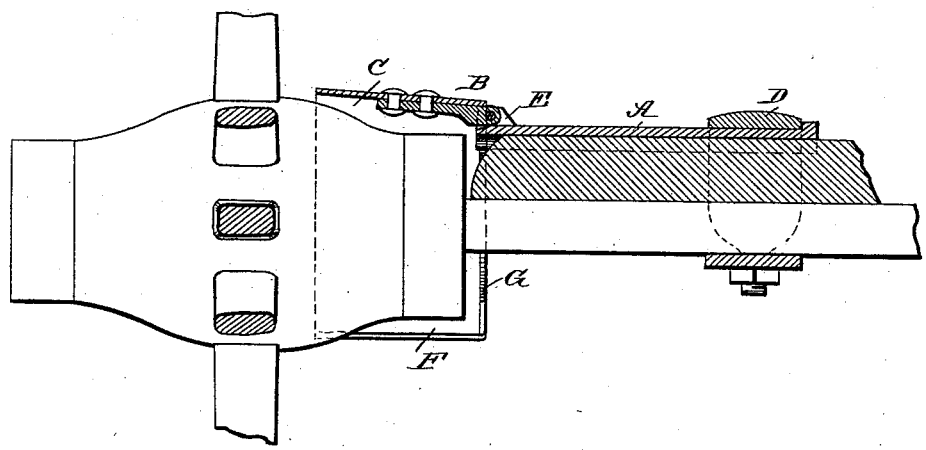
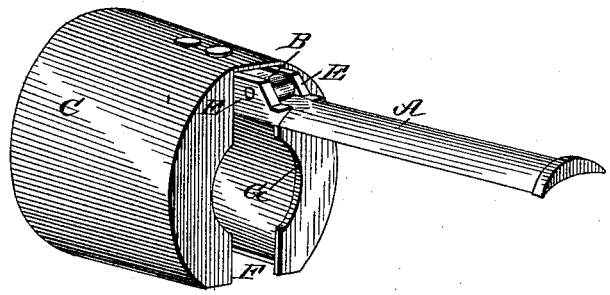
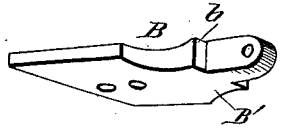
WITNESSES:
Fred G. Dieterich
M. D. Blondel
INVENTOR:
Humphrey Trembath.
BY Munn & Co.
ATTORNEYS

UNITED STATES PATENT OFFICE.

HUMPHREY TREMBATH, OF EVART, MICHIGAN.

SAND-BAND.

SPECIFICATION forming part of Letters Patent No. 428,870, dated May 27, 1890.

Application filed September 21, 1889. Serial No. 324,688. (No model.)

*To all whom it may concern:*

Be it known that I, HUMPHREY TREMBATH, of Evart, in the county of Osceola and State of Michigan, have invented a new and useful Improvement in Sand-Guards, of which the following is a specification.

My invention consists in a new and improved guard for excluding sand, mud, and dust from the hubs of wheels and the spindles of axles, and my invention will be hereinafter fully described and claimed.

Referring to the accompanying drawings, Figure 1 is a side view, partly in section, of my improved sand-guard as applied. Fig. 2 is a perspective view of my improvement, and Fig. 3 is a detail view of the hinge-piece.

The same letters of reference indicate corresponding parts in all the figures.

Referring to the several parts by letter, A indicates a metal plate or bar, which fits longitudinally on top of a vehicle-axle, near the end of the same, as shown, the plate or bar A being curved or rounded on its lower side to conform to the shape of the axle. The plates A are each secured on the axle by a clip D, and the parts A for the forward axle are made longer than those for the rear axle of a vehicle, in order to enable the clip D to be moved nearer to or farther from the wheel, which may be necessary in adjusting the tongue or pole to the front axle, as the circle-bars or fifth-wheels of tongues are constructed of different widths; also, it may be necessary to move the clips D in fitting thills to the front axle.

The plates or bars A for a rear axle are shorter than those for the front axle, as they are stationary. The outer end of the part A is formed with the jaws E on its upper side.

C indicates the hood or protector, which is in the form of a truncated cone and is formed with the open lower side F. The smaller closed end of the hood C is formed with the vertical opening G, slightly rounded at its central part.

To the inner side of the upper part of the hood C is riveted a hinge-piece B, the outer end of which passes out through the upper part of the opening G, and is apertured to adapt it to be hinged between the jaws E at the outer end of the plate A. The outer end B' of the hinge-plate is shouldered at b on its lower side, which holds the hinge-piece B with its inner end slightly up in a slanting position, so that when the device is in position it holds the hood C from drooping down or resting on the hub of the wheel, as will be readily understood.

My protector or guard is placed in position by securing the plate A on the axle and turning the hood C down, when the wheel is slipped on the end of the axle, with the hub end inside the hood C.

In oiling the wheel and spindle the wheel is removed from the spindle, and the hinged hood is then turned up for convenience in oiling or greasing the spindle.

It will be seen that the hood will effectually exclude sand, mud, and dust from the hub of the wheel and spindle of the axle, the hood being large enough to allow the wheel-hub to revolve freely within it without touching it at any point.

By hinging the hood C, as shown, I am enabled to raise it up clear of the wheel-hub for convenience in oiling and greasing the wheel.

My invention is designed for all kinds of vehicles, and will be made of different sizes to suit different-sized wheel-hubs and axles.

Having thus described my invention, what I claim, and desire to secure by Letters Patent, is—

The combination, in a sand-band, of the long supporting-bar A, formed at its outer end with the perforated jaws E, the hood C, the hinge-piece B, riveted to the hood C and having the shouldered apertured outer end B pivoted between the end jaws of the bar A, and a clip D, adapted to be moved back or forth over the supporting-bar, substantially as set forth.

HUMPHREY TREMBATH.

Witnesses:
HENRY D. TURNER,
M. E. PARKINSON.